United States Patent [19]

Berkowitz et al.

[11] Patent Number: 4,811,280
[45] Date of Patent: Mar. 7, 1989

[54] DUAL MODE DISK CONTROLLER

[75] Inventors: Frederick J. Berkowitz, Old Bridge; Sanford S. Brown, River Plaza, both of N.J.

[73] Assignees: American Telephone and Telegraph Company, New York, N.Y.; AT&T Bell Laboratories, Murray Hill, N.J.

[21] Appl. No.: 505,107

[22] Filed: Jun. 16, 1983

[51] Int. Cl.[4] .................. G06F 13/00; G06F 7/28; G11B 5/09

[52] U.S. Cl. .................. 364/900; 369/48; 369/93; 360/48; 360/50

[58] Field of Search ... 364/200 MS File, 900 MS File; 369/48, 59, 111, 93; 360/48, 50

[56] References Cited

U.S. PATENT DOCUMENTS

| | | | |
|---|---|---|---|
| 4,215,400 | 11/1977 | Denko | 364/200 |
| 4,232,365 | 11/1980 | Englund | 364/200 |
| 4,241,420 | 12/1980 | Fish et al. | 364/900 |
| 4,298,929 | 11/1981 | Capozzi | 364/200 |
| 4,432,025 | 2/1984 | Grogan | 360/48 |
| 4,435,752 | 3/1984 | Winkelman | 364/200 |
| 4,439,829 | 3/1984 | Tsiang | 364/200 |
| 4,476,526 | 10/1984 | Dodd | 364/200 |
| 4,490,782 | 12/1984 | Dixon et al. | 364/200 |
| 4,497,050 | 1/1985 | Beetstra | 369/59 |
| 4,513,392 | 4/1985 | Shenk | 364/900 |
| 4,539,605 | 9/1985 | Hoshino et al. | 360/32 |

FOREIGN PATENT DOCUMENTS

2045479 10/1980 United Kingdom.

Primary Examiner—Thomas M. Heckler
Assistant Examiner—Christina M. Eakman
Attorney, Agent, or Firm—David H. Tannenbaum; David R. Padnes

[57] ABSTRACT

A dual mode disk controller is disclosed for use between a host processor and its storage medium for controlling data transfer to and from the storage medium. The data is formatted on the medium in two distinct formats, one capable of bulk fast transfers useful in a swapping operation, and the other capable of periodic slower transfers as is acceptable for file retrieval. The disk controller is designed having a small fast buffer memory for accepting information from the storage medium. File transfer data is transferred immediately without host CPU intervention, to a larger cache memory. The host CPU accesses the fast buffer memory periodically to retrieve swap transfer data while only accessing the larger cache memory when it needs to retrieve the file formatted information.

12 Claims, 6 Drawing Sheets

FIG. 1

FIG. 2
INTERLEAVES

DISK DIAGRAM OF "FILE" TRANSFER

EFFECTIVE DATA RATE = $\dfrac{512 \text{ BYTES}}{1680 \mu s}$ = 305 KBYTES/SEC

FIG. 5

FIG. 6
DISK DIAGRAM OF "SWAP" TRANSFER

EFFECTIVE DATA RATE = $\dfrac{512 \text{ BYTES}}{1120 \mu s}$ = 457 KBYTES/SEC

FIG. 8

"SWAP" TRANSFER FLOWCHART
(READ OPERATION)

FIG. 9

2:1 INTERLEAVE FORMAT TABLE

| ABSOLUTE POSITION INDICATOR | SECTOR # WRITTEN IN HEADER FIELD |
|---|---|
| INDEX | 0 |
| SECTOR PULSE 1 | 12 |
| SECTOR PULSE 2 | 1 |
| SECTOR PULSE 3 | 13 |
| SECTOR PULSE 4 | 2 |
| SECTOR PULSE 5 | 14 |
| SECTOR PULSE 6 | 3 |
| SECTOR PULSE 7 | 15 |
| SECTOR PULSE 8 | 4 |
| SECTOR PULSE 9 | 16 |
| SECTOR PULSE 10 | 5 |
| SECTOR PULSE 11 | 17 |
| SECTOR PULSE 12 | 6 |
| SECTOR PULSE 13 | 18 |
| SECTOR PULSE 14 | 7 |
| SECTOR PULSE 15 | 19 |
| SECTOR PULSE 16 | 8 |
| SECTOR PULSE 17 | 20 |
| SECTOR PULSE 18 | 9 |
| SECTOR PULSE 19 | 21 |
| SECTOR PULSE 20 | 10 |
| SECTOR PULSE 21 | 22 |
| SECTOR PULSE 22 | 11 |

FIG. 10

3:1 INTERLEAVE FORMAT TABLE

| ABSOLUTE POSITION INDICATOR | SECTOR # WRITTEN IN HEADER FIELD |
|---|---|
| INDEX | 0 |
| SECTOR PULSE 1 | 8 |
| SECTOR PULSE 2 | 16 |
| SECTOR PULSE 3 | 1 |
| SECTOR PULSE 4 | 9 |
| SECTOR PULSE 5 | 17 |
| SECTOR PULSE 6 | 2 |
| SECTOR PULSE 7 | 10 |
| SECTOR PULSE 8 | 18 |
| SECTOR PULSE 9 | 3 |
| SECTOR PULSE 10 | 11 |
| SECTOR PULSE 11 | 19 |
| SECTOR PULSE 12 | 4 |
| SECTOR PULSE 13 | 12 |
| SECTOR PULSE 14 | 20 |
| SECTOR PULSE 15 | 5 |
| SECTOR PULSE 16 | 13 |
| SECTOR PULSE 17 | 21 |
| SECTOR PULSE 18 | 6 |
| SECTOR PULSE 19 | 14 |
| SECTOR PULSE 20 | 22 |
| SECTOR PULSE 21 | 7 |
| SECTOR PULSE 22 | 15 |

DUAL MODE DISK CONTROLLER

BACKGROUND OF THE INVENTION

This invention relates to computer system disk access control and more particularly to such systems where both swapping and file access capability is desired from a single disk drive (actuator).

In disk systems it is typical that the disk can transfer data faster than large dynamic memories can store it, especially when the memory is also used for execution by a host CPU. Thus, for fast bulk transfers where the maximum transfer rate is required, such as occur during swapping operations, the performane of the CPU is impacted.

For some disk transfers, however, where fast transfer rates are not imperative, it is desirable to transfer data from the disk to the host CPU memory without host CPU intervention thus enabling the CPU to execute instructions faster. Thus, in prior systems it has become customary to use two disk drives (actuators), one arranged in an efficient format for bulk transfers at a high transfer rate and the other arranged in a different format efficient to transfer disk data without host CPU intervention at a lower transfer rate. These prior arrangements have the disadvantage of requiring two disk drives (actuators), even when the system would not otherwise require such duplication.

The use of two disk drives, however, allows the user to physically separate the "file" area (lower transfer rate) from the "swap" area (higher transfer rate), thereby allowing file accesses and swaps to be overlapped. For example, if only one disk drive is used, a swap cannot take place until a file access on that drive is completed. With two disk drives, on the other hand, on disk can be transferring data while the head of the other disk is being positioned to the desired location, thus reducing the head positioning delay.

In small systems, where both low cost and high performance are imperative, two disk drives and a separate direct memory access (DMA) controller would raise the cost to an unacceptable level. Accordingly, a one disk solution where both types of transfers can occur economically is needed.

SUMMARY OF THE INVENTION

We have designed a dual mode disk controller which allows one disk drive to be formatted in different physical sections in the manner best suited for the type of information stored in that section.

During a "swap" read operation from the disk drive, the data from the bulk transfer (swapping) section is read into a small fast buffer memory by the I/O processor and the host CPU, cycle by cycle, then removes the retrieved data from the buffer and moves it to the CPU main memory. During a "swap" write operation to the disk drive, the data to be written into the swap section is written into the small buffer memory by the host CPU, cycle by cycle, and the transferred to the disk drive by the I/O processor.

During a "file" read operation from the disk drive, the data from the file storage section is first read into the buffer memory by the I/O processor and then transferred to a larger slower cache memory also by the I/O processor for retrieval or use by the host CPU when host CPU time is available. During a "file" write operation to the disk drive, the host CPU transfer the data to be written to the disk into the slow cache memory when CPU time is available. Then the I/O processor transfers that data from the slow cache into the fast buffer memory and then out to the disk.

The key to achieving high performance using one disk drive lies in the physical formatting. The disk controller logically separates the disk into two sections: a "file" area, and a "swap" area.

The "file" area transfers data at a slower rate than the "swap" area, but intervention by the host CPU is not required to transfer the data to/from the disk. Hence, the CPU is free to perform other tasks while the disk controller handles the data transfer, thus increasing performance for normal file accesses.

On the other hand, the "swap" area yields a higher data transfer rate, but intervention is required by the host CPU to transfer the data to/from the disk. This is needed in cases where the CPU has to immediately perform a context switch and requires the highest data transfer rate possible to minimize the context switch time.

The "file" area is physically formatted by the I/O processor with a 3:1 interleave, and the "swap" area is physically formatted by the I/O processor with a 2:1 interleave. Therefore, given a disk with a 1M byte/second raw data transfer rate, the "file" area can yield a multiple sector data transfer rate of 333K bytes/second (⅓ of the raw rate), and the "swap" area can yield a multiple sector rate of 500K bytes/second (½ of the raw rate).

DESCRIPTION OF DRAWING

These and other objects and features will become more apparent from a review of the drawing showing one embodiment of our invention in which.

DETAILED DESCRIPTION

Figure 1:
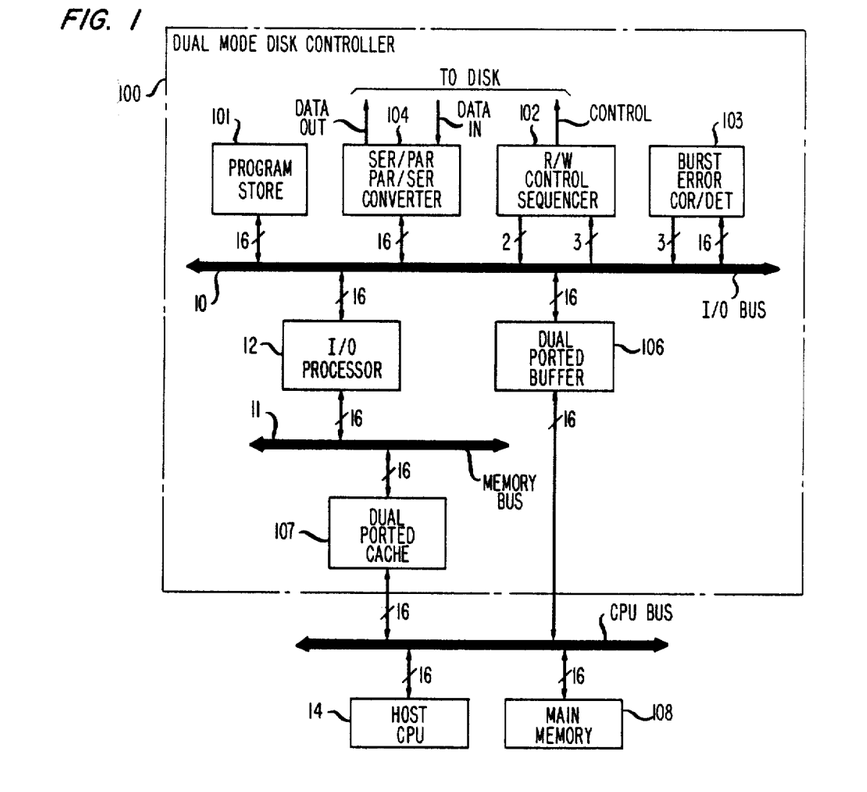
FIG. 1 is a block diagram showing the interrelationship of the elements of the invention.

Shown in FIG. 1 is a block diagram of the dual mode disk controller 100. Input/Output processor 12, by way of example, can consist of an Intel 8089 I/O Processor Chip Set. Program store 101 consists of 8K bytes of program ROM, dual ported buffer 106 consists of 1K byte of dual ported static buffer RAM, while dual ported cache 107 consists of 128K bytes of dual ported dynamic cache RAM. Also connected to bus 10 are Read/Write Control Sequencer 102, serial to parallel/parallel to serial converter 104, and burst error correction/detection circuit 103. Host CPU 14 can be, for example, an Intel 8086 or a Motorola 68000 chip. Main memory 108 is used by the CPU for storing instructions and data for execution and, for example, can be 128K bytes of dynamic RAM.

Figure 2:
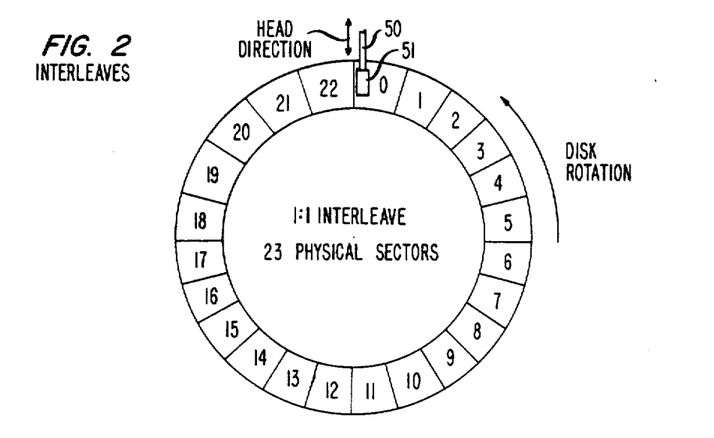
FIGS. 2, 3 and 5 show the physical layout of data on one track of the disk.

FIG. 2 shows a packing technique for storing blocks of data on one track of a disk. Shown is a 1 to 1 interleaving format having 23 sectors following physically from 0 and going consecutively one block at a time to block 22. While only one track is shown, a disk contains many such tracks and head 51 moves in and out to retrieve data from any track.

Figure 5:
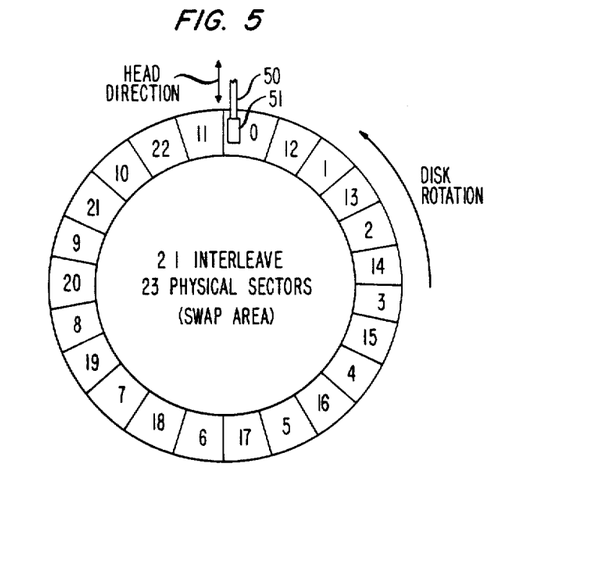
Figure 6:
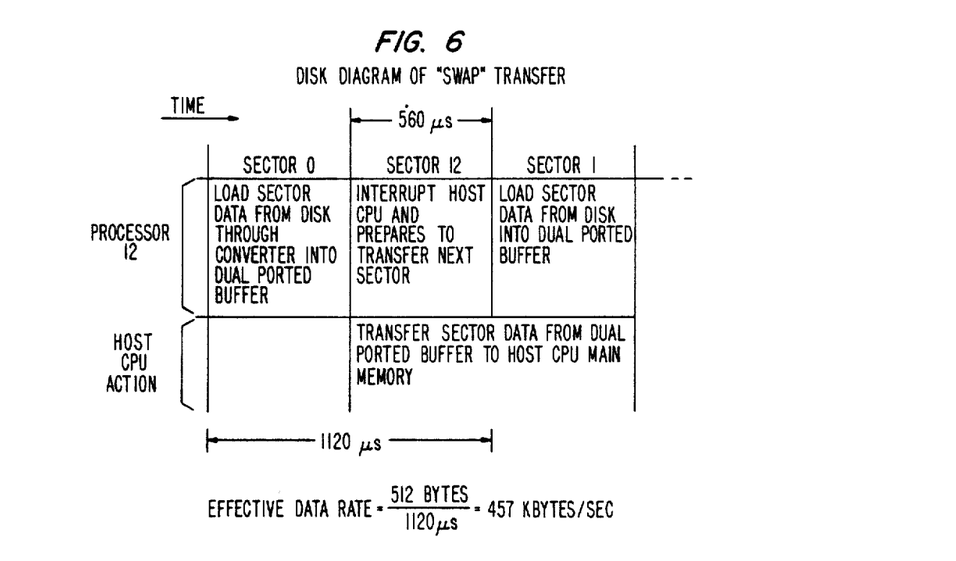

FIG. 5 shows a 2 to 1 interleaving where to logically contiguous blocks of data are separated by a physical block having a nonsequential address. Thus, as the sectors pass under disk drive head 51 (held by arm 50) moving counterclockwise, the data in block 12 would come before the data from block 1. For example, if the data sample to be stored were to be larger than a single data block then the data, instead of being stored in adjacent blocks, as would be in the case in 1 to 1 interleaving, would be stored in blocks 0 and 1 separated by another data block, namely data block 12. The reason for this type of interleaving is derived from timing considerations and head movement time and will be discussed in more detail hereinafter.

Figure 3:
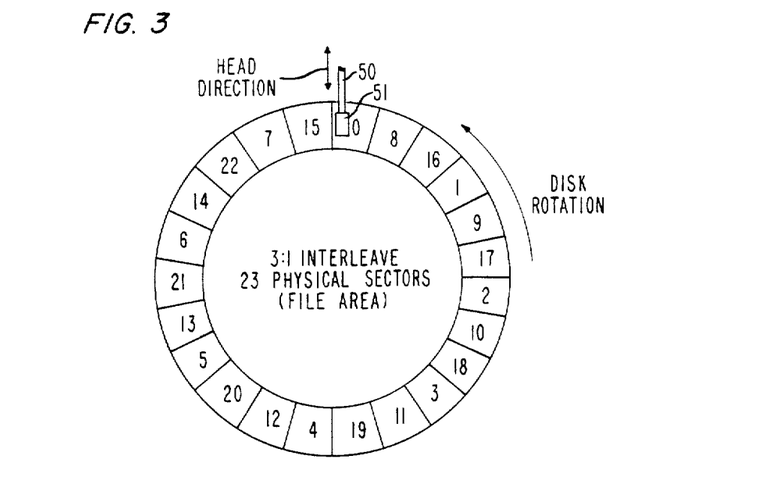

FIG. 3 shows a 3 to 1 interleaving where consecutively numbered (logically contiguous) blocks are separated by two non-sequential logically non-contiguous data blocks.

SECTOR CREATION AND CONTROL

Every sector on the disk has a data field and a header field. The sector number of a particular sector is written into its header field by the I/O processor during formatting to enable the I/O processor to properly identify that sector during an access operation. The disk drive supplies two signals to the dual mode disk controller: (1) a sector signal, and (2) an index signal. When dual mode disk controller 100 receives a pulse on the INDEX line (not shown), this indicates the beginning of a track. A pulse on the SECTOR line (not shown) indicates the beginning of each individual sector within that track.

Figure 9:
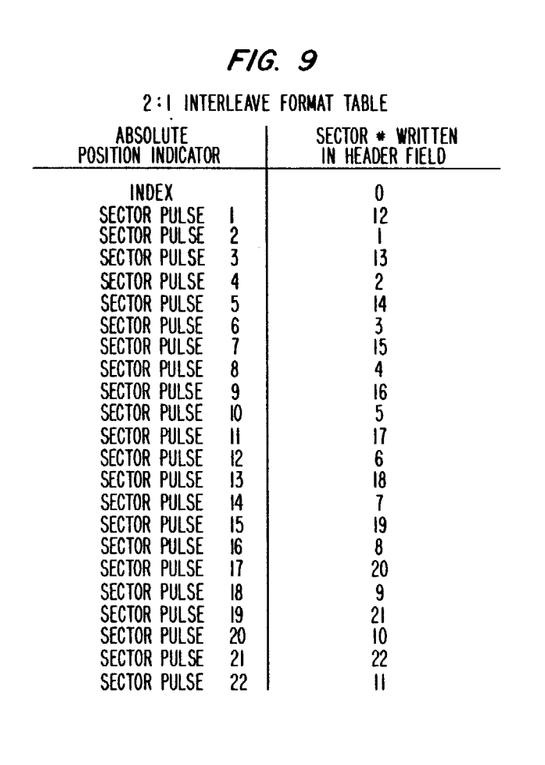
FIGS. 9 and 10 show memory tables used by the I/O processor for formatting the disk.
Figure 10:
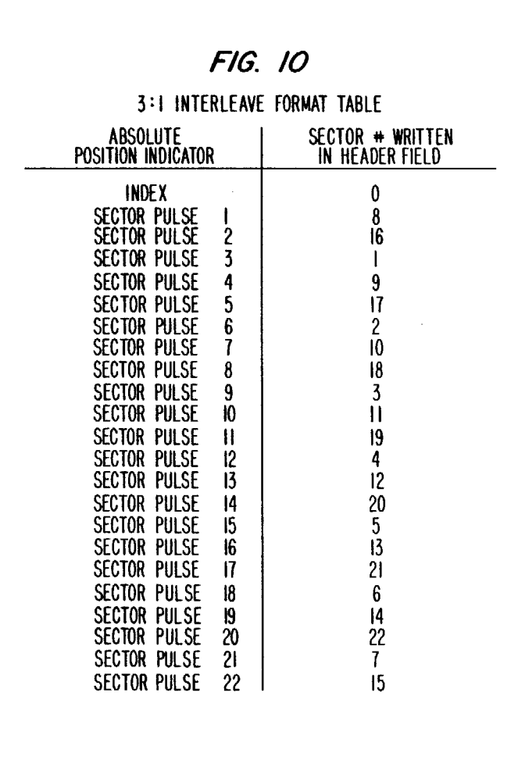

Using the SECTOR and INDEX lines, and knowing the desired interleave factor, i.e., 2:1 or 3:1 or any other factor, the I/O processor can write the appropriate sector number into the header field of a sector using tables stored in program memory 101. The tables, shown in FIGS. 9 and 10, correlates a particular sector-/index pulse to a particular sector number.

When formatting disk drives having only one data surface, dual mode disk controller 100 formats one half of the tracks with a 2:1 interleave factor and the other half with a 3:1 interleave factor. When formatting disk drives with more than one data surface, dual mode disk controller 100 formats one half of the surfaces with a 2:1 interleave and the other half with a 3:1 interleave.

DATA TRANSFER

Two disk data transfer scenarios follow: a "file" transfer, and a "swap" transfer. Both scenarios described are read operations and will be described with respect to the flow charts in FIGS. 7 and 8. Write operations are essentially the same, but in reverse sequence.

FILE TRANSFER

Figure 7:
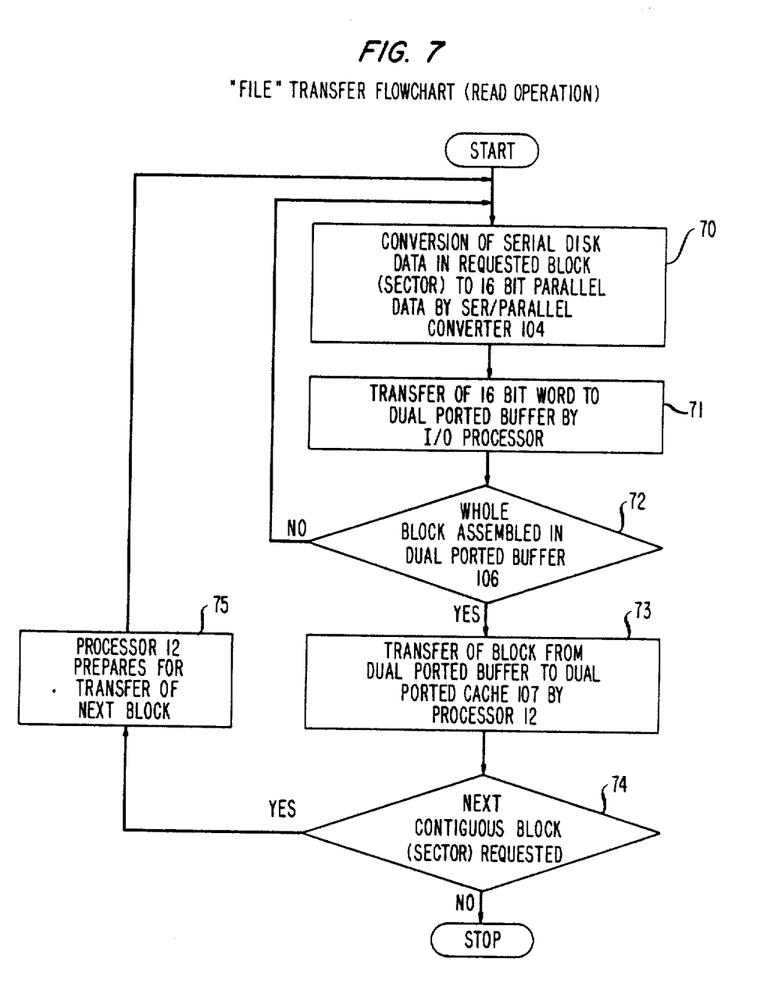
FIGS. 7 and 8 show flow charts of the operation of the data retrieval and data storage procedures of our invention.

As shown in FIG. 7, for a "file" data transfer, the following actions occur:

In step 70 serial disk data enters serial parallel converter 104 from a numbered disk data block (say block 0) and is converted to 16 bit parallel data. In step 71 after each 16 bit word is assembled by converter 104, it is transferred over bus 10 by I/O processor 12 to dual ported buffer 106 which, as discussed priorly, is a high speed RAM. After the entire block of data is assembled in dual ported buffer 106 (step 72), it is transferred through I/O processor 12 into dual ported cache 107 (step 73).

If the next logically contiguous data block is required (step 74) I/O processor 12 prepares for the transfer of that block (step 75) and the whole sequence is repeated. If not, the host CPU is informed that the data transfer is completed.

SWAP TRANSFER

Figure 8:
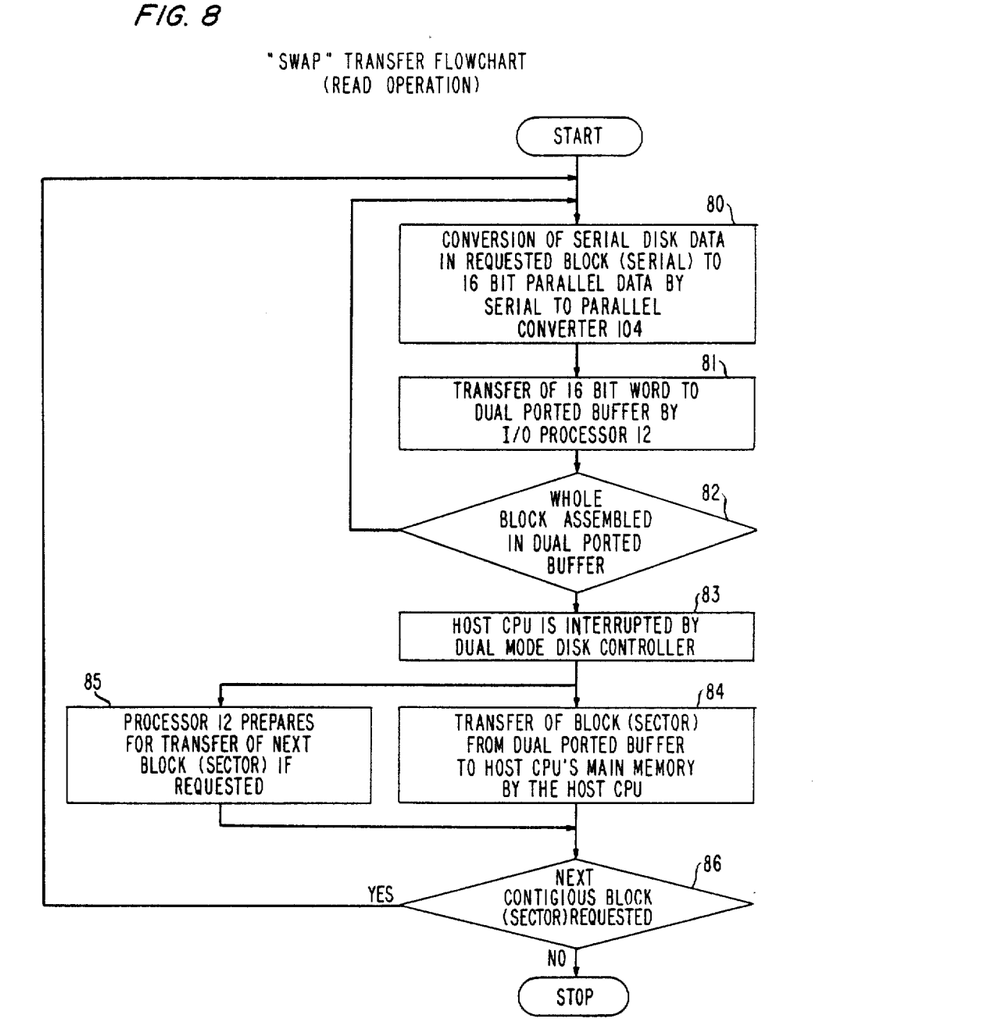

For a "swap" data transfer, as shown in FIG. 8, the following actions occur: Steps 80, 81 and 82 are the same as steps 70, 71 and 72. After the whole block of data is assembled in dual ported buffer 106, the host CPU is interrupted (step 83) and the host CPU transfers the data out of dual ported buffer 106 (step 84) to its main memory while I/O processor 12 is preparing (step 85) for the transfer of the next logically contiguous data block from the disk (if one is required).

From the above scenarios, it can be seen that "file" transfer (FIG. 7) requires I/O processor 12 to perform an additional data block transfer (step 73) to the dual ported cache. Because of this extra transfer, a 3:1 interleave is required to provide the I/O processor enough time to prepare for the transfer of the next logically contiguous data block from the disk, if one is required. Since the I/O processor performs the data transfer to the dual ported cache, the host CPU can perform other tasks while the transfer is taking place, thereby increasing overall system performance.

TIMING CONSIDERATIONS

Figure 4:
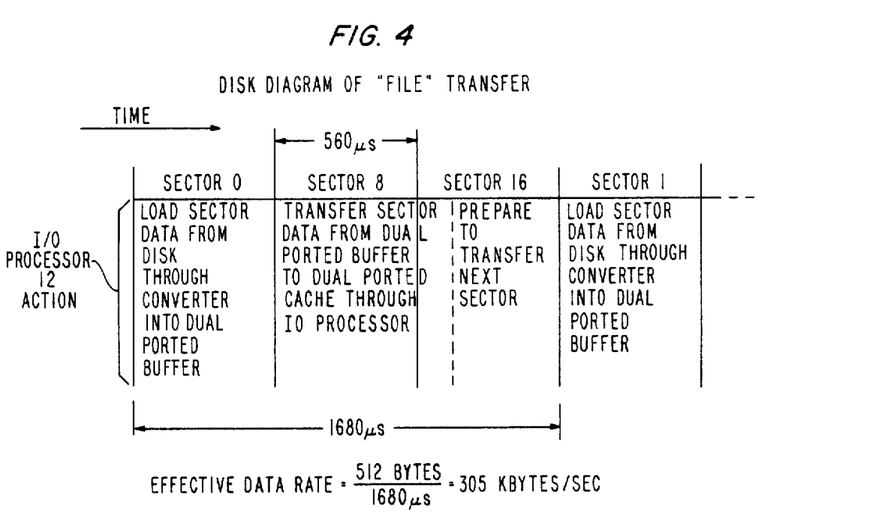
FIGS. 4 and 6 show disk timing diagrams of the "file" and "swap" transfers.

FIG. 4 shows the timing of I/O processor 12 as it moves "file" data from the disk. During the time consumed by I/O processor 12 as it moves data first from converter 104 to buffer 106, then to cache 107, and prepares for the next transfer (if any), two data blocks (sectors 8 and 16) go by under head 50. When the head is positioned over sector 1 (after a delay of 1120 microseconds) the processor is ready to read data from that sector if step 74 (FIG. 7) calls for data transfer from the next logically contiguous data block. Note that if a 1:1 or 2:1 interleave factor is used then the disk would have to make a complete revolution before the head would be positioned to read the "next" block of information.

FIG. 5 shows the timing of I/O processor 12 as it moves "swap" data from the disk. Since I/O processor 12 is not involved in moving the data out of buffer 106, it is ready to transfer data from the next sector sooner. Thus a 2:1 interleaving is used, yielding a 457K byte/sec transfer rate as opposed to a 305 K byte/sec transfer rate for the "file" transfer. It should be noted that if a faster host CPU (with fast main memory) and a faster I/O processor are used, the "swap" section of the disk drive can be formatted with a 1:1 interleave, yielding a transfer rate of approximately 1M byte/sec for "swap" transfers.

Since "file" transfers generally occur more often than do "swap" transfers, CPU time is conserved at a slight decrease in bit transfer rate using the same disk drive (actuator) and disk controller for both transfer types.

One obvious question is: why can't the data from serial to parallel converter 104 be transferred directly to dual ported cache 107, thus eliminating the need for dual ported buffer 106?

The reason is that dual ported cache 107 using today's technology cannot accept the data at the rate at which it is being supplied by serial to parallel converter 104, because its worst case access time is slower than the raw disk data transfer rate from converter 104. On the other hand, dual ported buffer 106 does have an access time equivalent to the raw disk data transfer rate; hence, it can accept data directly from serial to parallel converter 104. Unfortunately, the static RAM used in dual ported buffer 106 is not as dense as the dynamic RAM used in dual ported cache 107 and thus, there is not enough physical circuit board space to accommodate a dual ported buffer large enough to eliminate the need for the dual ported cache.

CONCLUSION

In conclusion, it can easily be seen that the dual mode disk controller offers much of the performance of a two disk drive (actuator) system using only one disk drive. Therefore, this invention is of interest to anyone who is designing a microcomputer system with the requirements of low cost, ability to perform context switching (swapping), and high performance use of a rotating storage medium. It should be obvious that while two disk formats (interleave) were discussed, other such formats (interleave) may also be used. Also, the relative format areas can vary from application to application and they need not be equal in size and the number of sectors in any format or on any track can be any desired value.

What is claimed is:

1. A controller for use between a host CPU and a storage medium for controlling the transfer of data to and from said storage medium, said storage medium being adapted for storing data segmented into physical data blocks with the data stored within any one data block having contiguous address locations and wherein said storage medium contains data storage areas having data segments interleaved in first and second formats, said controller comprising
    a first memory having a density operable to receive from a first formatted portion of said storage medium fixed amounts of data, said first memory requiring periodic service by said CPU during any information transfer interval involving said first formatted portion, said first memory also having an access time fast enough to transfer data at the storage medium data transfer rate, and
    a second memory having a density large enough to receive via said first memory from a second formatted portion of said storage medium multiples of said fixed amounts of data without requiring host CPU intervention during the data transfer interval.

2. The controller set forth in claim 1 wherein said storage medium is a rotating disk and wherein said first formatted portion contains contiguous data stored in physical non-contiguous segments separated by n intervening segments, said intervening n segments having data non-contiguous with said data stored in said first formatted portion, and
    wherein said second formatted portion contains contiguous data stored in physical non-contiguous segments separated by m intervening segments said intervening m segments having data non-contiguous with said data stored in said second formatted portion, m being greater than n.

3. The invention set forth in claim 2 wherein said storage medium is a single disk drive.

4. The invention set forth in claim 2 wherein said disk controller further comprises a microprocessor for controlling data transfer from said disk to said first and second memories.

5. The invention set forth in claim 2 wherein said first memory is a static RAM and wherein said second memory is a dynamic RAM.

6. The invention set forth in claim 2 wherein n is 1 and m is 2.

7. A method of storing computer data on a storage medium for subsequent retrieval, said method comprising the steps of
    formatting a first area of data storage on said storage medium arranged in sectors, said sectors having a first inerleaved factor,
    formatting a second area of data storage on said storage medium arranged in sectors, said sectors having a second interleaved factor different from said first interleaved factor,
    transferring data from said first area for a first computer operation, this transfer being from said first area to a low capacity fast memory and then to a higher capacity slower memory under control of a single medium storage actuator, and then out of said higher capacity slower memory under host CPU control, and
    transferring data from said second area for a second computer operation, said transfer being from said second area to said low capacity fast memory under control of said single storage medium actuator and then out of said low capacity fast memory under host CPU control, said data transferred from said second area for said second computer operation bypassing said higher capacity slower memory.

8. The method set forth in claim 7 wherein said second interleaved factor contains logically contiguous data contained in non-contiguous sectors always separated by one sector having data logically non-contiguous with said data contained within said separated second interleaved factor sectors, and
    wherein said first interleaved factor contains logically contiguous data contained in non-contiguous sections always separated by two sectors having data logically non-contiguous with said data contained within said separated first interleaved factor sections.

9. A dual mode disk controller for formatting and retrieving data on a single disk actuator, said controller comprising
    means for establishing sectors of data on a first area of a disk accessed by said actuator, said sectors being formatted with a first interleaved factor,
    means for establishing sectors of data on a second area of said disk, said sectors being formatted with a second interleaved factor,
    means for transferring data from said first area for certain computer operations to a low capacity fast memory and then out of said memory under host CPU control, and
    means for transferring data from said second area without intervention by said host CPU for other computer operations, said data being transferred from said second area to said low capacity fast memory and then to a higher capacity slower memory, said higher capacity slower memory being directly accessible by said host CPU.

10. The disk controller set forth in claim 9 wherein said first interleaved factor contains logically contiguous data contained in non-contiguous sectors always separated by one sector having data logically non-contiguous with said data contained within said separated first interleaved factor sectors, and wherein said second interleaved factor contains logically contiguous data contained in non-contiguous sections always separated by two sectors having data logically non-contiguous with said data contained within said separated second interleaved factor sections.

11. The invention set forth in claim 9 wherein said actuator has a single disk head and wherein said first and second interleaved factors are on different tracks of one surface of said disk.

12. The invention set forth in claim 9 wherein said actuator has multiple heads each associated with a different disk surface and wherein said first and said second interleaved factors are on different disk surfaces.

* * * * *